(12) United States Patent  
Perry

(10) Patent No.: US 9,401,096 B1
(45) Date of Patent: Jul. 26, 2016

(54) CHORD PLAYING ATTACHMENT APPARATUS

(71) Applicant: Travis Perry, Dothan, AL (US)

(72) Inventor: Travis Perry, Dothan, AL (US)

(*) Notice: Subject to any disclaimer, the term of this patent is extended or adjusted under 35 U.S.C. 154(b) by 0 days.

(21) Appl. No.: 14/487,791

(22) Filed: Sep. 16, 2014

Related U.S. Application Data

(63) Continuation of application No. 13/857,611, filed on Apr. 5, 2013, now Pat. No. 8,835,731.

(60) Provisional application No. 61/620,743, filed on Apr. 5, 2012.

(51) Int. Cl.
  *G10D 3/08* (2006.01)
  *G09B 15/06* (2006.01)
  *G10G 5/00* (2006.01)

(52) U.S. Cl.
  CPC *G09B 15/06* (2013.01); *G10D 3/08* (2013.01); *G10G 5/005* (2013.01)

(58) Field of Classification Search
  CPC .................................. G10D 3/00; G10D 3/08
  See application file for complete search history.

(56) References Cited

U.S. PATENT DOCUMENTS

| 2,669,151 A * | 2/1954 | MacCaferri | 84/317 |
| 3,422,717 A * | 1/1969 | Roussel | 84/317 |
| 4,154,134 A * | 5/1979 | Schreiber | 84/317 |
| 4,331,059 A * | 5/1982 | Marabotto | 84/317 |
| 4,566,365 A * | 1/1986 | Huston, Jr. | 84/317 |
| 4,796,506 A * | 1/1989 | Gray | 84/317 |
| 8,835,731 B1 * | 9/2014 | Perry | 84/317 |
| 8,969,694 B2 * | 3/2015 | Perry | 84/317 |
| 2013/0239772 A1 * | 9/2013 | Perry | 84/317 |

* cited by examiner

*Primary Examiner* — Robert W Horn
(74) *Attorney, Agent, or Firm* — Garvey, Smith, Nehrbass & North, LLC; Mackenzie D. Rodriguez; Seth M. Nehrbass

(57) ABSTRACT

A removable chord playing attachment and related method is disclosed. The chord playing attachment may be attached to a guitar or similar stringed instrument, and the user may use the chord playing attachment to learn to play the instrument. The present invention discloses a design that does not function as a capo, which allows the user play chords in standard keys. The present invention includes a specially configured nut or connector or anchor that forms a removable connection with a chord playing unit. The present invention encourages novices to learn to play the instrument in stages and eventually remove the invention entirely. A companion teaching manual is also disclosed.

18 Claims, 11 Drawing Sheets

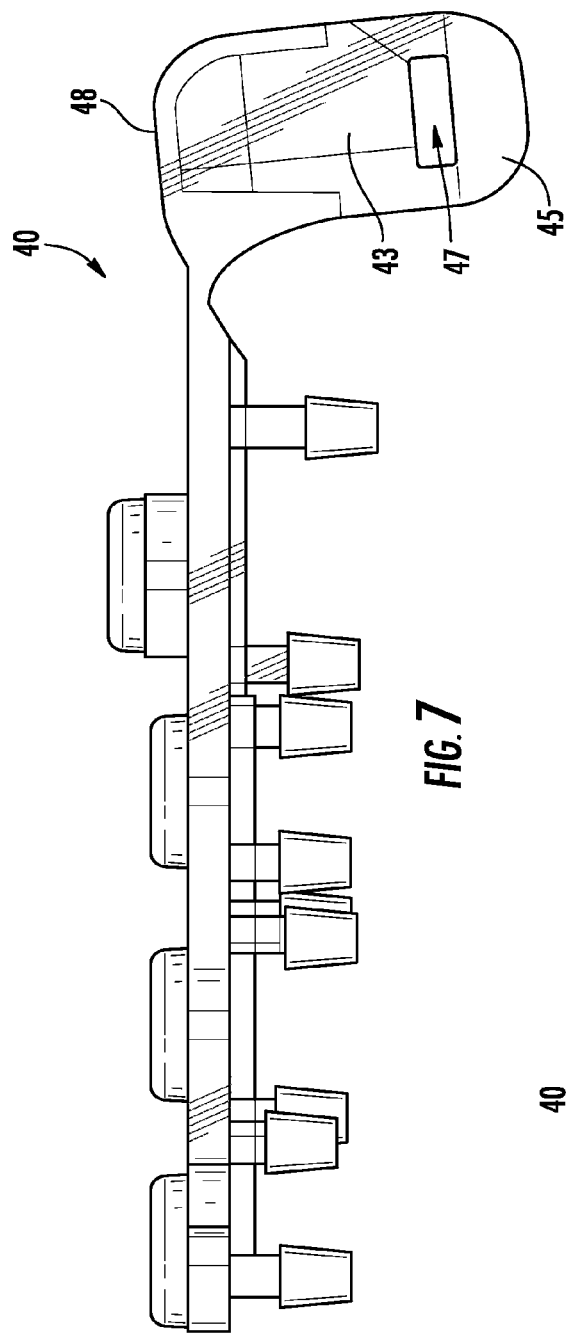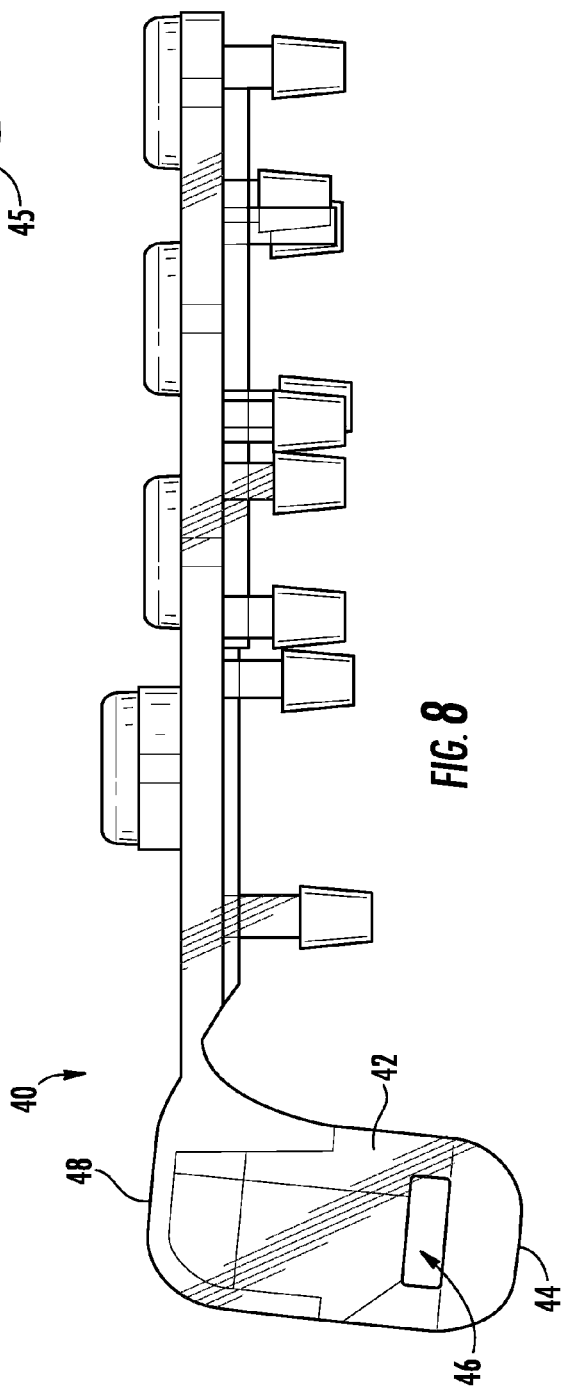

CHORD PLAYING ATTACHMENT APPARATUS

CROSS-REFERENCE TO RELATED APPLICATIONS

This is a non-provisional of U.S. Provisional Patent Application Ser. No. 61/620,743, filed 5 Apr. 2012, and incorporated herein by reference. Priority of U.S. Provisional Patent Application Ser. No. 61/620,743, filed 5 Apr. 2012, is hereby claimed.

STATEMENT REGARDING FEDERALLY SPONSORED RESEARCH OR DEVELOPMENT

Not applicable

REFERENCE TO A "MICROFICHE APPENDIX"

Not applicable

FIELD OF THE INVENTION

This invention relates generally to chord playing attachments and specifically to a specially configured chord playing attachment that may be used to play a guitar or be employed as a teaching tool, and wherein a specially configured nut arrangement enables disassembly of the chord playing portion from the nut in order to play the guitar without the chord playing portion.

BACKGROUND OF THE INVENTION

Two problems present themselves when a student attempts to learn the guitar or a similar stringed instrument. The guitar strings injure the student's fingertips until the student develops calluses; and the student faces a steep learning curve prior to playing actual music. The latter problem often causes severe frustration, which in turn causes most novices to quickly abandon their learning attempts. Teaching the student a series of musical chords allows the student to play music quickly, which encourages the student to keep playing until greater understanding is gained and reduces frustration.

Various chord attachments have been developed to allow the user to play chords easily without injuring their fingers. None of these devices have ever attained widespread popularity because none of them have been designed as teaching tools. Many of the older versions were intricate, heavy, and hard to use. Some even mask the strings from the user's view, resulting in the user being unable to learn any chords while using the device. Newer versions are more usable, but do not encourage the user to play any strings directly. This forces the user to build up calluses all at once and forces the user to make the mental leap directly from playing by pressing buttons to playing by depressing complex string combinations. None of the previous chord attachments allow the user to take an intermediate step or steps to ease them into the process of playing without the aid of training devices. Also, none of the previous chord attachments were paired with a user friendly training manual to teach the user how to play chords in the right order to create songs without requiring the user be able to read standard sheet music. Additionally, many of the previous chord attachments depress all of the guitar strings at a specific point, which causes those devices to act as a capo. A capo device is undesirable because it changes the key of all of the chords played, which means that any attempts to play the guitar with the attached device will result in music that is nonstandard.

Therefore, what is needed is a chord playing attachment. The chord playing attachment should allow the user to play some chords by hand and some chords by depressing buttons. The chord playing attachment should also be used in combination with a color-coded training manual. Furthermore, other desirable features and characteristics of the present invention will become apparent when this background of the invention is read in conjunction with the subsequent detailed description of the invention, appended claims, and the accompanying drawings.

My PCT Patent Application Serial No. PCT/US11/44002, filed 14 Jul. 2011, and published on 19 Jan. 2012 under publication no. WO 2012/009533, is hereby incorporated herein by reference.

SUMMARY OF THE INVENTION

The present invention advantageously fills the aforementioned deficiencies by providing a specially configured chord playing attachment. The chord playing attachment of the present invention includes chord members (e.g., levers) with color-coded finger pads that enable a user to depress the strings necessary to play a chord or part of a chord. The chord playing attachment is also usable in combination with a color-coded training manual for easy learning. In one embodiment, the levers and buttons are removable from a specially configured guitar "nut" so that a user can play the guitar without the chord playing portion.

The present invention now will be described more fully hereinafter with reference to the accompanying drawings, which are intended to be read in conjunction with both this summary, the detailed description, and any preferred and/or particular embodiments specifically discussed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

The drawings contained herein exemplify two of the embodiments of the claimed invention. The invention is not limited to the embodiments shown. The embodiments shown are purely examples, and the invention is capable of many variations of said embodiments. In the drawings.

FIG. 7 is a partial side view of the preferred embodiment of the apparatus of the present invention;

FIG. 8 is a partial side view of the preferred embodiment of the apparatus of the present invention;

DETAILED DESCRIPTION OF THE INVENTION

Figure 1:
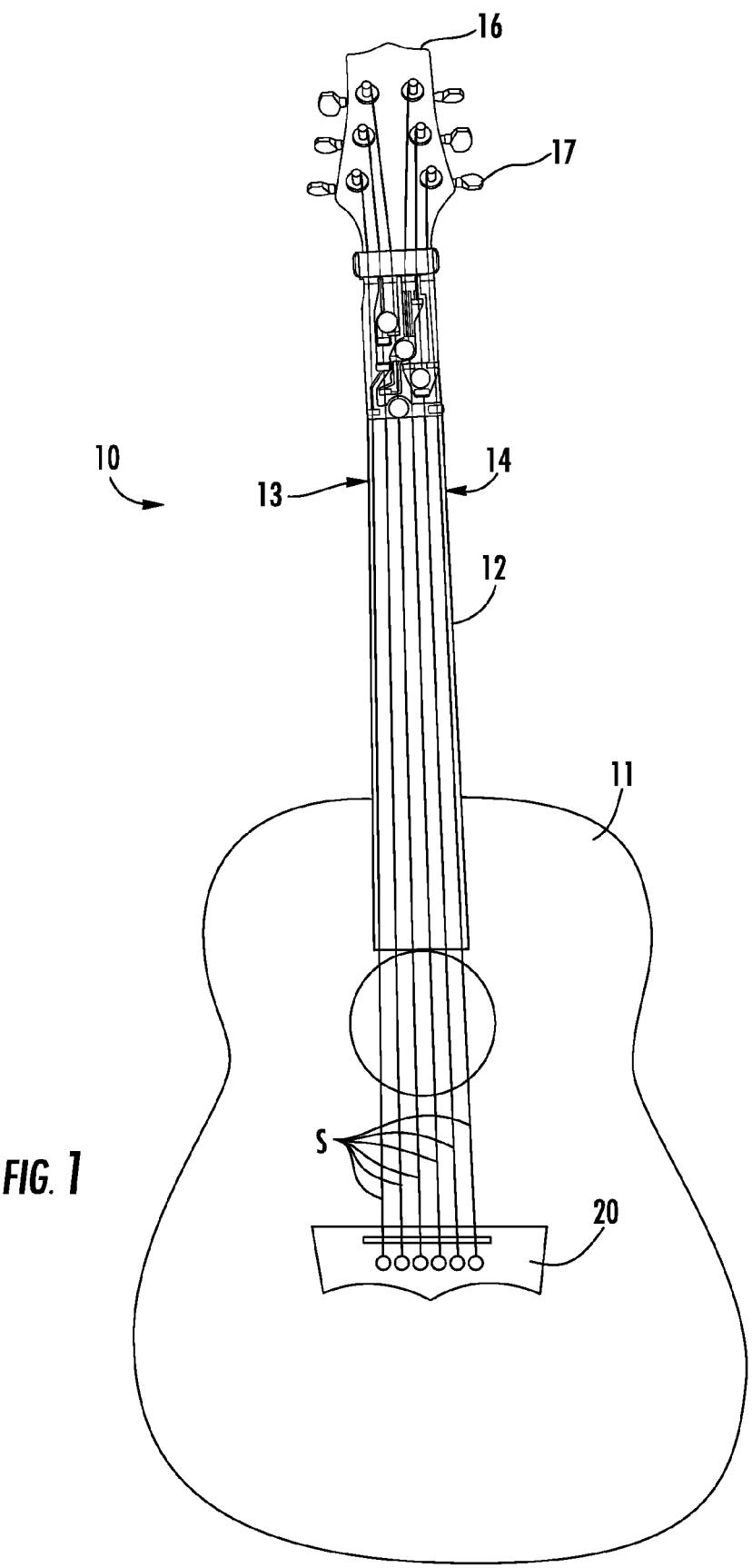
FIG. 1 illustrates a perspective view of the preferred embodiment of the apparatus of the present invention.
Figure 2:
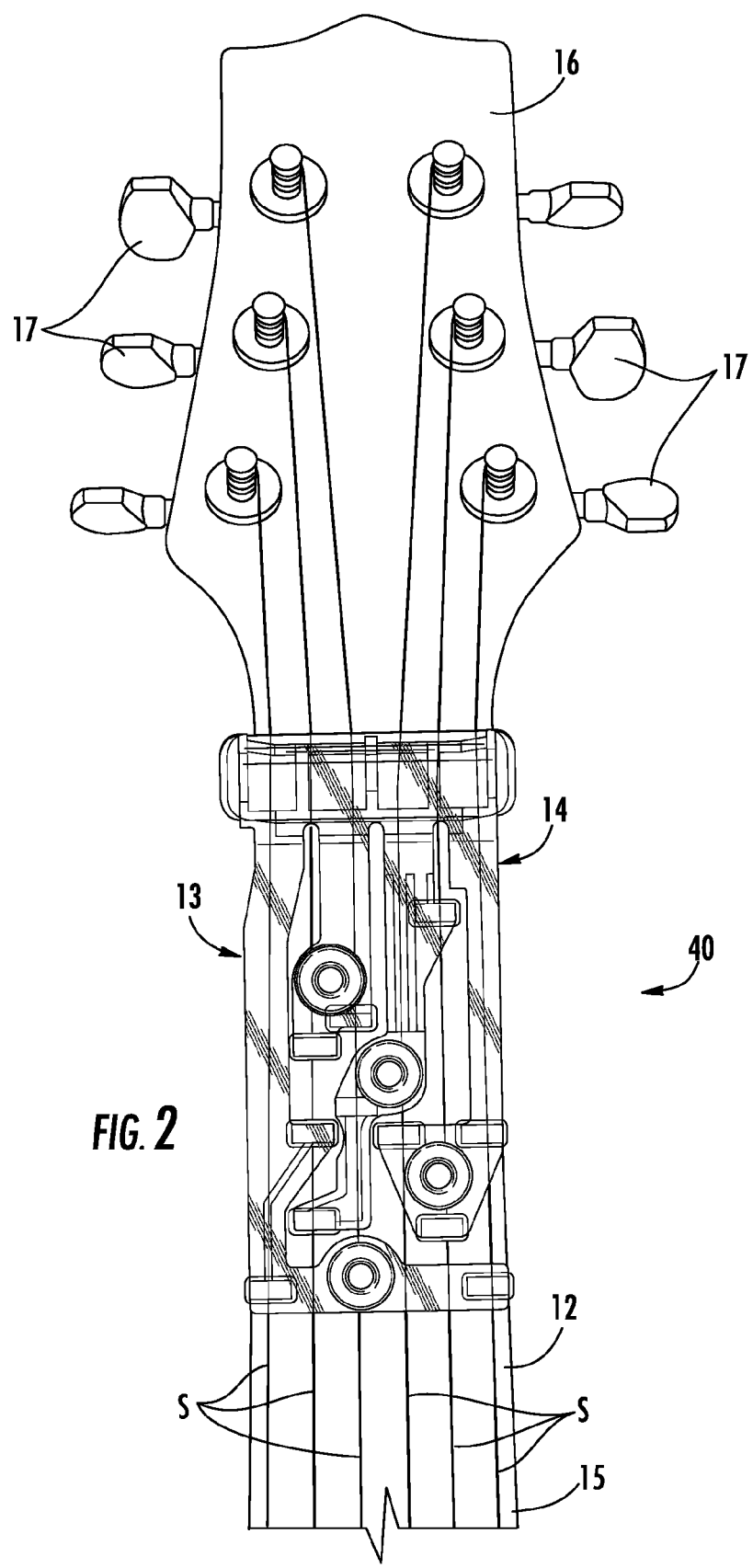
FIG. 2 illustrates a partial top view of the preferred embodiment of the apparatus of the present invention.

FIGS. 1-18 show the preferred embodiment of the apparatus of the present invention designated generally by the numeral 10. Guitar apparatus 10 provides a body 11, neck 12, head 16 and strings S. The neck 12 has a first neck side 13 and a second neck side 14. The neck 12 provides a fret board 15. The head 16 carries a plurality of tuning pegs 17 for adjusting tension of each string S. The fret board 15 has a plurality of parallel frets 18. The body 11 can provide a pick guard 19. Bridge 20 is provided on body 11. String S attach to bridge 20.

Figure 3:
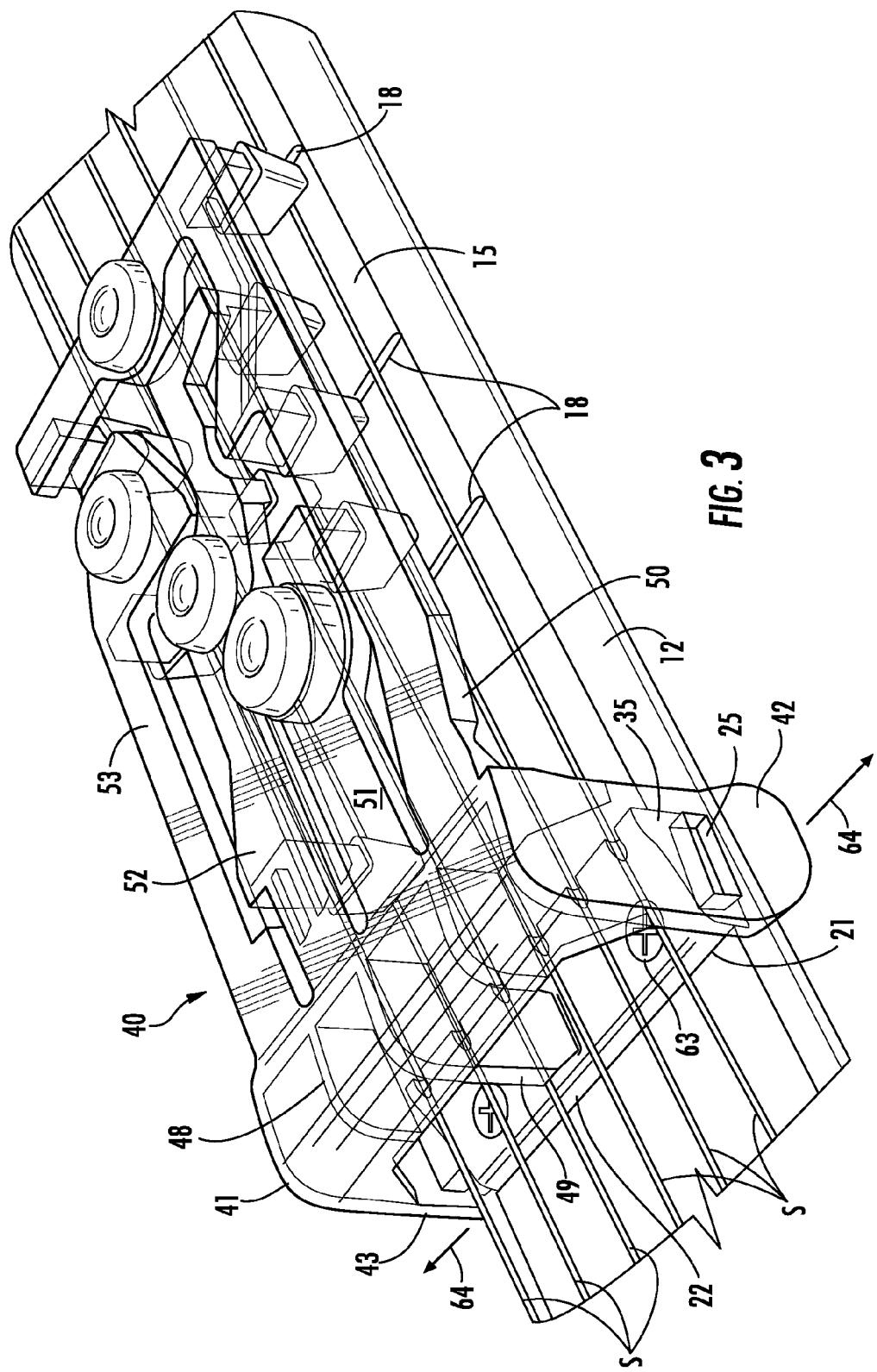
FIG. 3 illustrates a partial perspective view of the preferred embodiment of the apparatus of the present invention.
Figure 4:
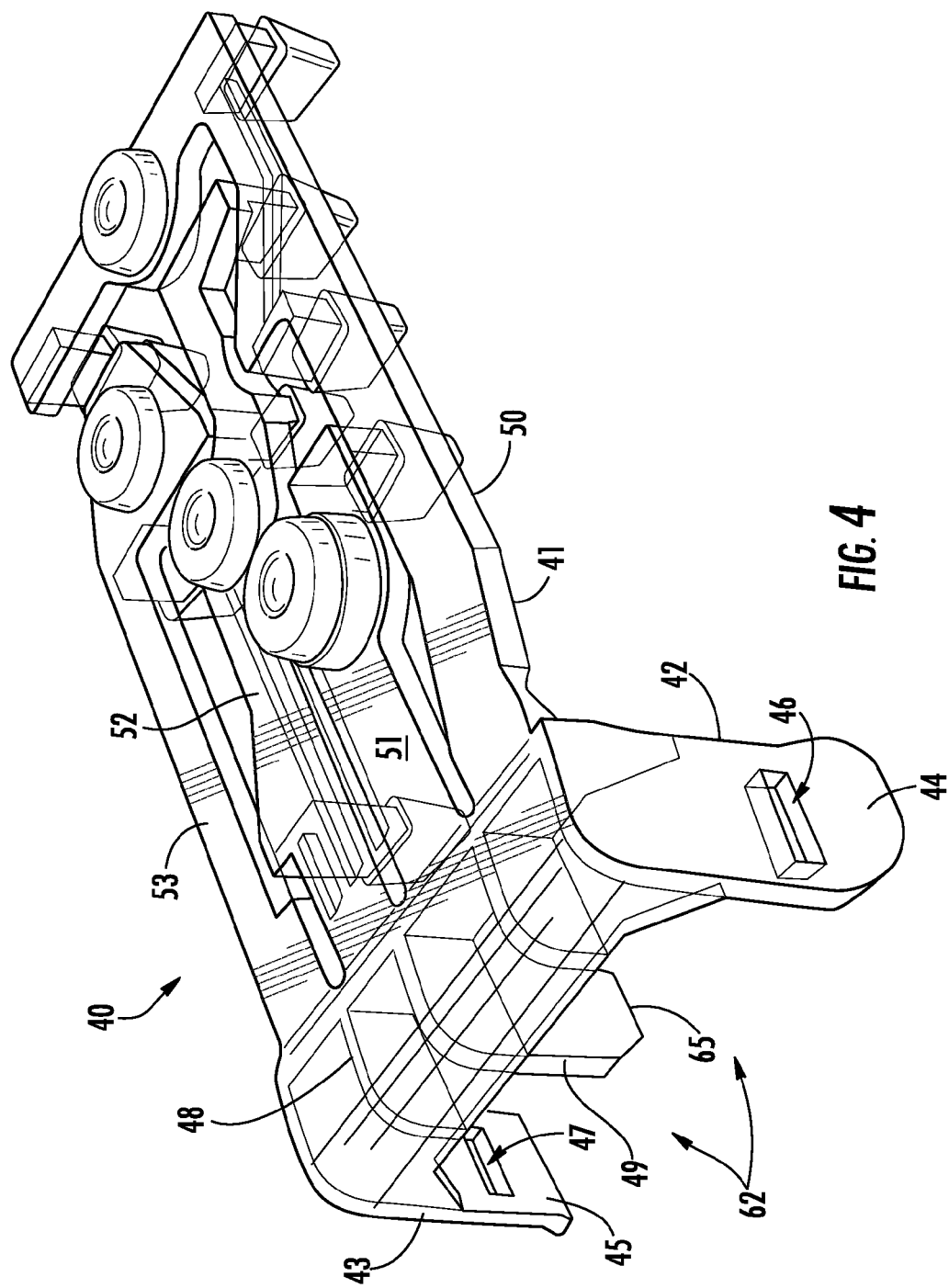
FIG. 4 illustrates a partial perspective view of the preferred embodiment of the apparatus of the present invention.

As part of the method and apparatus of the present invention, a slot 21 can be cut or milled in neck 12 next to head 16 as seen in FIG. 3. The slot 21 is receptive of a specially configured nut or connector or anchor 22.

The nut or connector or anchor 22 provides a base portion 23 having a lower surface 28 that registers against the neck 12. If a slot 21 is milled in neck 12, the base 23 rests in the slot 21. Spaced apart openings 29 can be provided in nut/connector/anchor 22 for attaching it to the neck 12 using fasteners 63 such as threaded wood screws (see FIG. 3).

Nut/connector/anchor 22 has a raised portion 30 having a plurality of string depressions 24, each receptive of a different one of the guitar string S. A pair of spaced apart side anchors or projections 25, 26 are provided. In between the side anchors or projections 25, 26 there can be provided a socket or longitudinal slot 27 (see FIG. 11). The longitudinal slot or socket 27 can provide a generally horizontal surface 31 and a generally vertical surface 32.

Nut/connector/anchor 22 has a front 33 and a rear 34. Nut/connector/anchor 22 has a first side 35 and a second side 36. Each of the side anchors or projections 25, 26 extends away from a side 35, 36 as shown in FIGS. 11-17. Preferably, first side 35 and second side 36 of nut/connector/anchor 22 are aligned with first neck side 13 and second neck side 14, respectively. When sides 35, 36 of nut/connector/anchor 22 are aligned with neck sides 13, 14, nut projections 25, 26 will extend beyond the sides of the neck 12.

Figure 9:
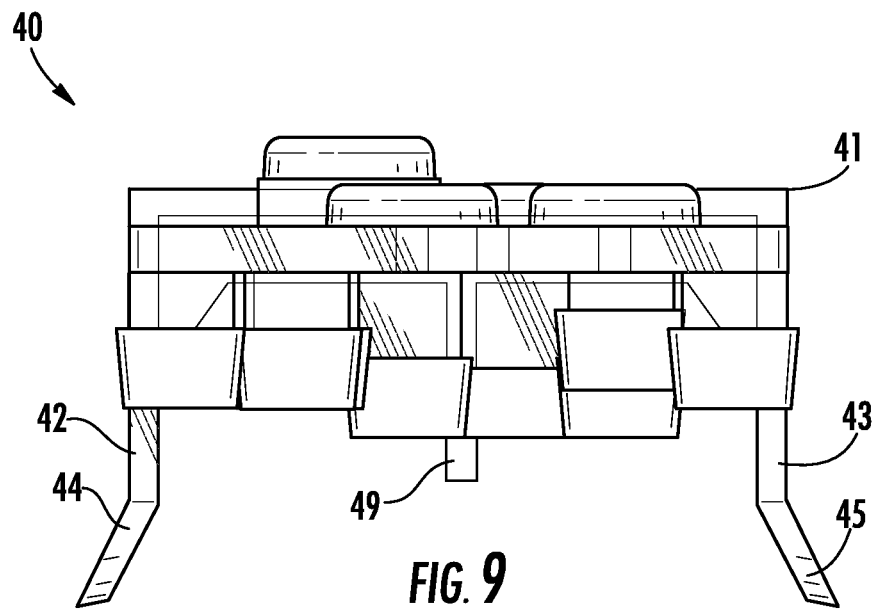
FIG. 9 is a partial end view of the preferred embodiment of the apparatus of the present invention.
Figure 10:
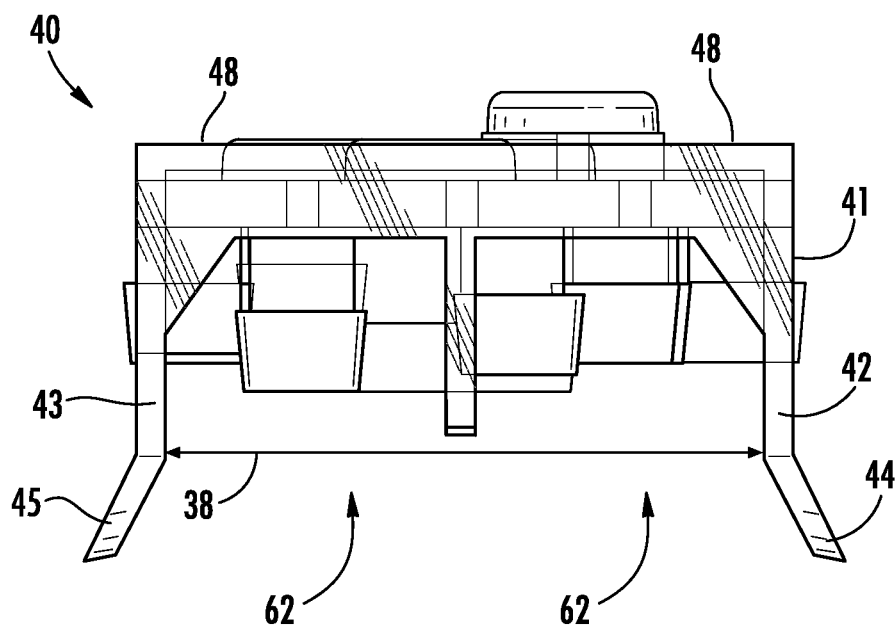
FIG. 10 is a partial end view of the preferred embodiment of the apparatus of the present invention.
Figure 11:
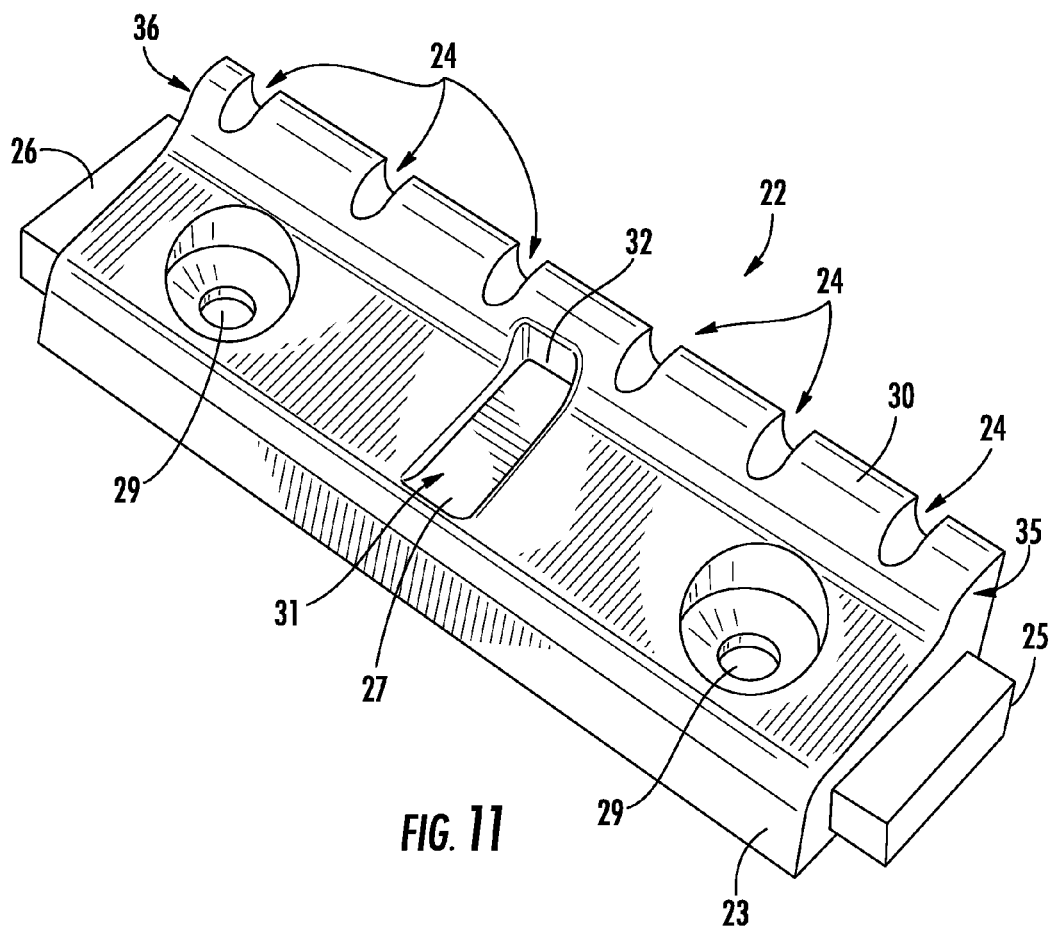
FIG. 11 is a partial perspective view of the preferred embodiment of the apparatus of the present invention.
Figure 12:
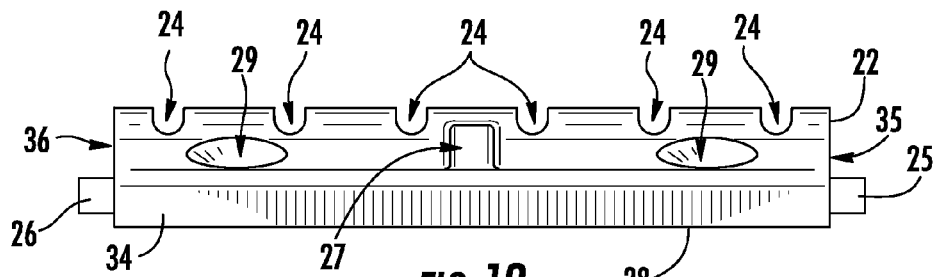
FIG. 12 is a partial front elevation view of the preferred embodiment of the apparatus of the present invention.
Figure 13:
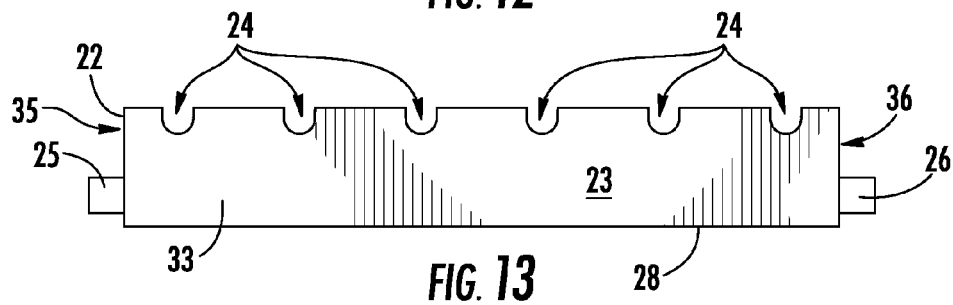
FIG. 13 is a partial rear elevation view of the preferred embodiment of the apparatus of the present invention.
Figure 14:
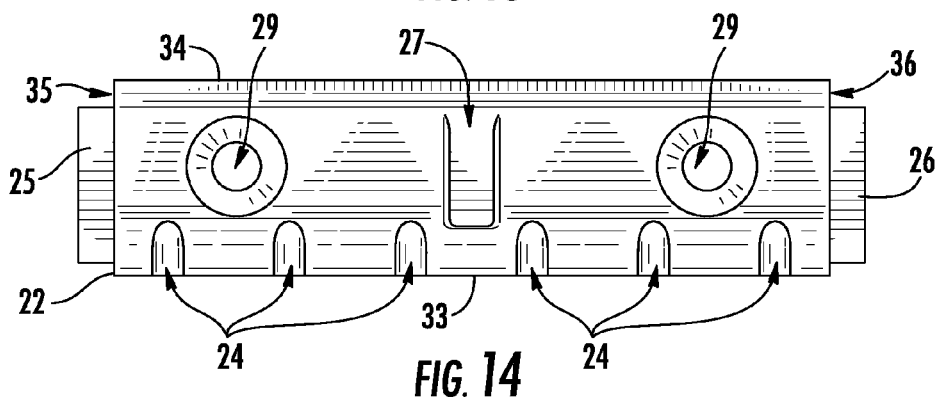
FIG. 14 is a partial top view of the preferred embodiment of the apparatus of the present invention.
Figure 15:
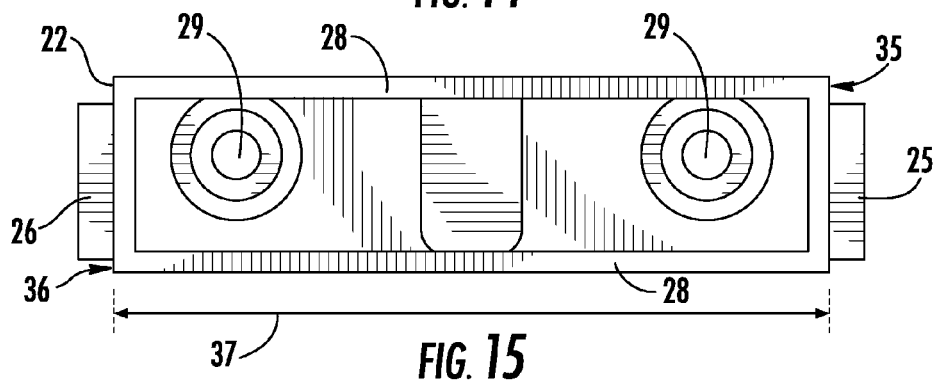
FIG. 15 is a partial bottom view of the preferred embodiment of the apparatus of the present invention.
Figure 16:
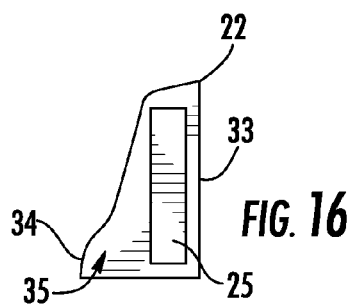
FIG. 16 is a partial side view of the preferred embodiment of the apparatus of the present invention.
Figure 17:
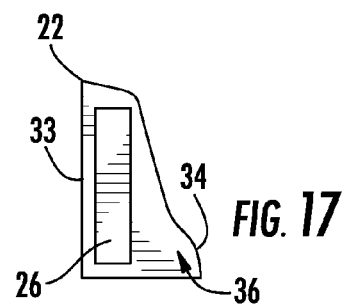
FIG. 17 is a partial side view of the preferred embodiment of the apparatus of the present invention.
Figure 18:
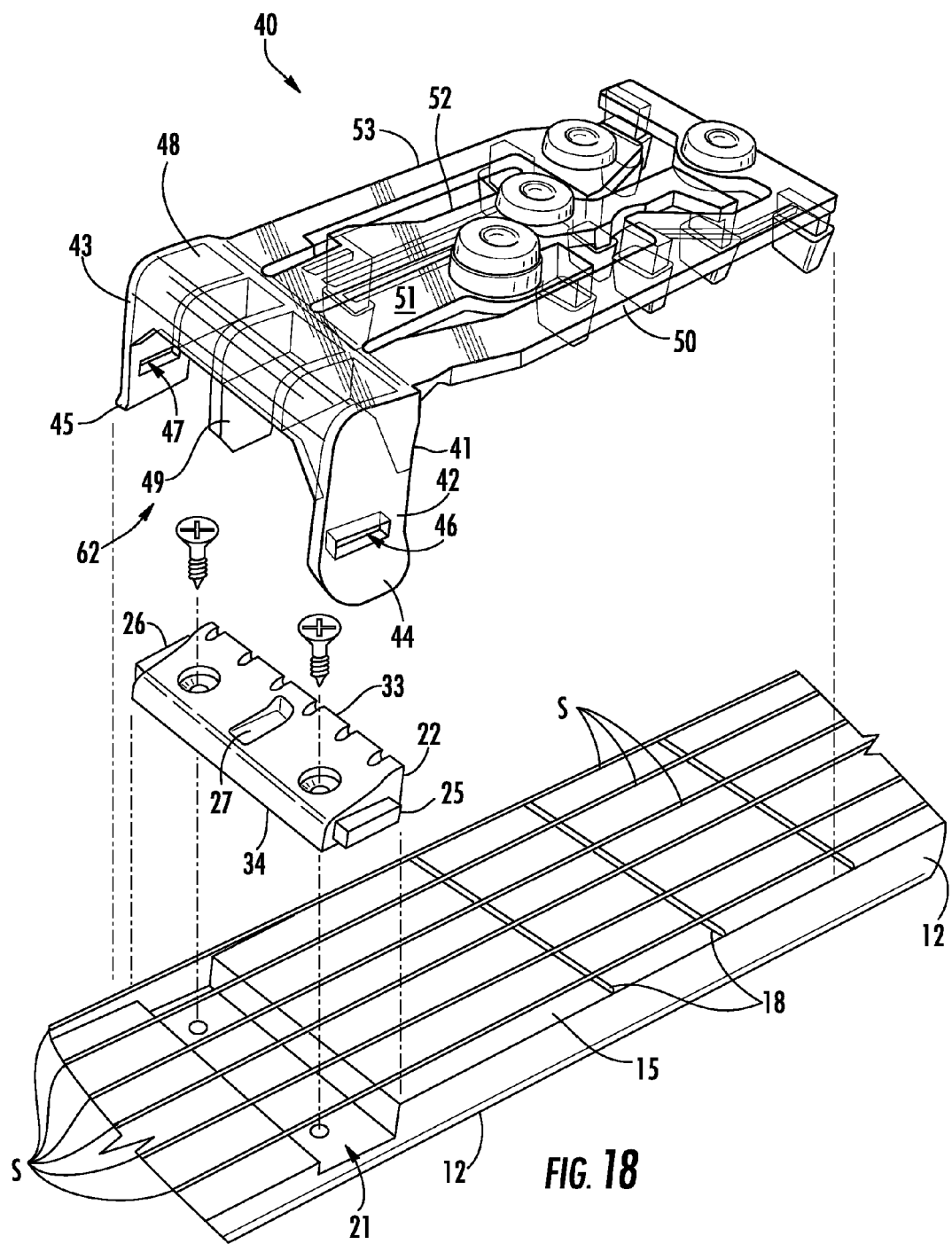
FIG. 18 is a partial perspective exploded view of the preferred embodiment of the apparatus of the present invention.

A chord playing attachment 40 (see FIGS. 2-10) is removably connectable to nut/connector/anchor 22 at the side anchors or projections 25, 26. The chord playing attachment 40 provides a frame 41 that can be of plastic (e.g., transparent plastic), metal or other material. The chord playing attachment 40 has opposed sides 42, 43 that form an arch 62 with transverse section 48. Diagonally extending tabs or angled flanges 44, 45 can extend down and away from sides 42, 43 as shown in FIGS. 9, 10. Each of the sides 42, 43 provides an opening. Side 42 provides opening 46. Side 43 provides opening 47. Each of the openings 46, 47 is sized and shaped to receive and connect with a side anchor or projection 25, 26. The distance 37 between sides 35, 36 can be equal to or slightly greater than the distance 38 between sides 42, 43 of frame 41 (see FIGS. 10 and 15). In this fashion, the sides 42, 43 clamp the nut/connector/anchor 22 with a clamping or interference fit connection.

When a side anchor or projection 25 or 26 extends into an opening 46 or 47, a side 35 or 36 of nut/connector/anchor 22 abuts or engages a side 42, 43 of frame 41 as shown in FIG. 3. In order to disconnect the chord playing attachment 40 from the nut/connector/anchor 22, a user simply grasps each of the sides 42, 43 or angled flanges/diagonally extending tabs 44, 45 and moves them apart in the direction of arrows 64 in FIG. 3. The arch 62 thus flexes to disconnect frame 41 from the nut/connector/anchor 22.

A central post/leg/flange 49 can extend downwardly from transverse portion 48 at a position midway between sides 42, 43 of chord playing attachment 40. The post 49 engages and occupies the longitudinal slot or socket 27 when chord playing attachment 40 is connected to nut/anchor/connector 22 and surface 65 engages surface 31.

Figure 5:
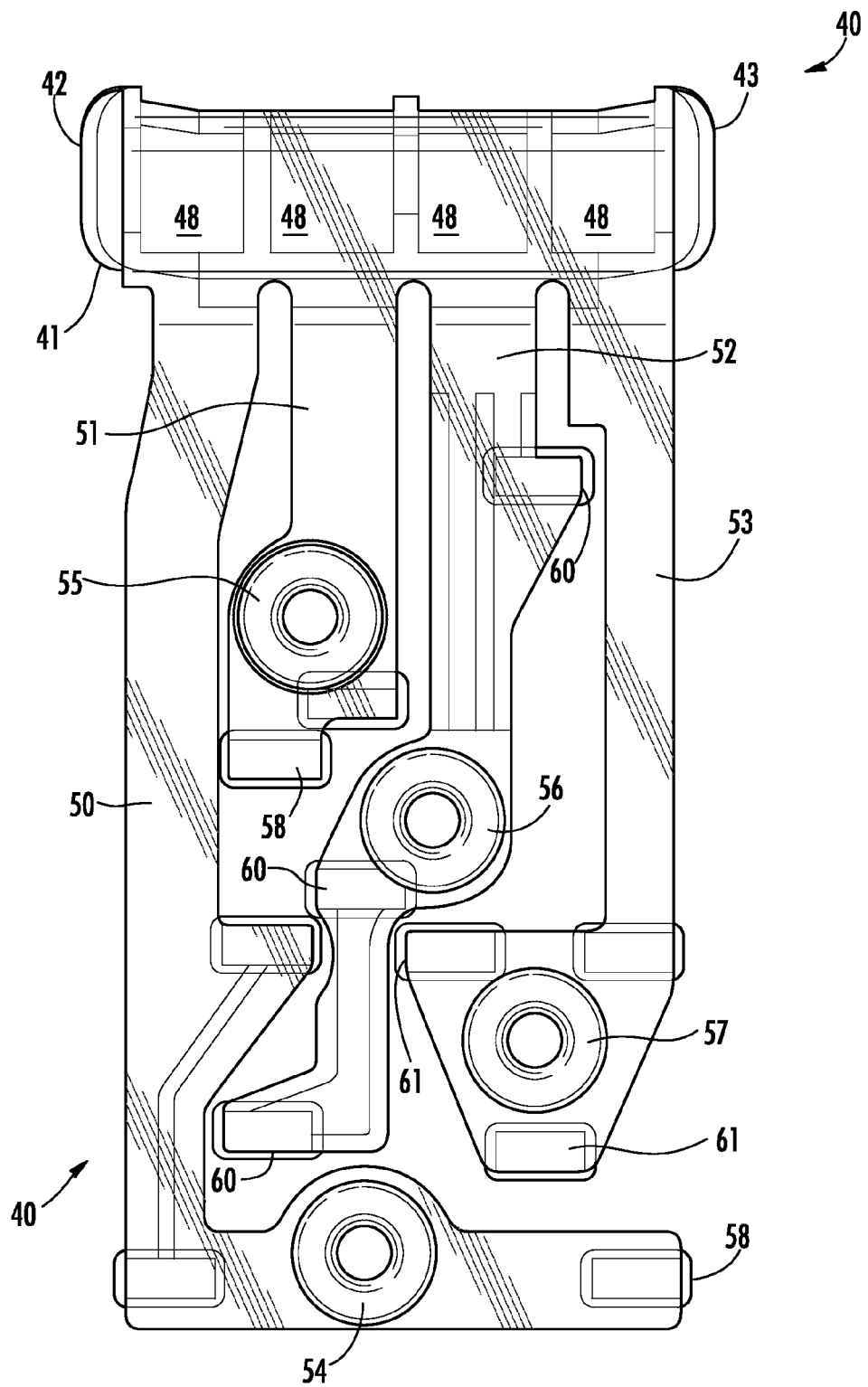
FIG. 5 is a partial top view of the preferred embodiment of the apparatus of the present invention.
Figure 6:
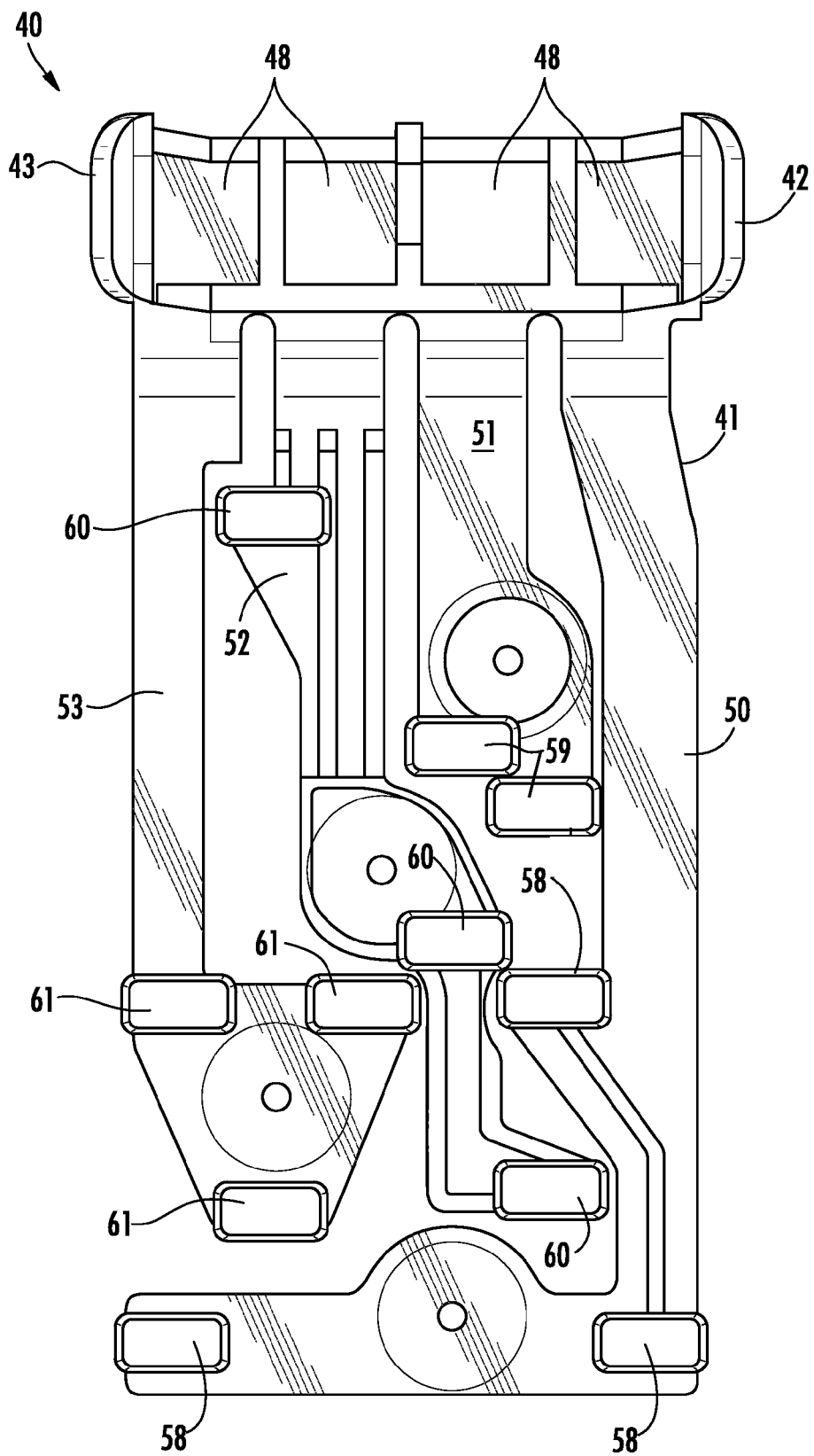
FIG. 6 is a partial bottom view of the preferred embodiment of the apparatus of the present invention.

Frame 41 supports a plurality of levers 50, 51, 52, 53. Each of the levers or depression members 50-53 can be provided with a button 54, 55, 56 or 57. In this fashion a user can push on a button 54-57 as selected for a particular chord in order to depress a selected lever 50, 51, 52 or 53. The buttons 54-57 can be the same as described in my prior PCT Application Serial No. PCT/US11/44002, filed 14 Jul. 2011, and published on 19 Jan. 2012 under publication no. WO 2012/009533. Each of the levers 50-53 is provided with a depression member 58-61. The depression members 58, 59, 60, 61 move down and contact and depress a string (or strings) S when a user presses on a selected lever 50-53 or its button 54-57. The depression members 58 are a part of lever 50. The depression members 59 are part of the lever 51. The depression member 60 is a part of the lever 52. The depression members 61 are a part of the lever 53. Each lever 50-53 can be integrally or removably attached to frame 41 at arch 62 as seen in FIG. 5.

The attachment apparatus of the present invention can be sized for ½ size guitars, ¾ size guitars, and full size guitars. The present invention includes both the attachment apparatus and the guitars to which the attachment apparatus is attached.

The present invention as shown in FIGS. 1-18 is commercially available from Peavey for ¾ size guitars, and full size guitars.

The inventor also plans to market a smaller attachment apparatus for ½ size guitars similar to what is shown in FIGS. 1-18. In the prototype, the overall length is 94 mm, the width is 47 mm, and the "B" string stud was moved down the neck approximately 7 mm. Optionally, the finger buttons can be built into the clear plastic mold and colored tabs (such as colored self-adhesive paper) can be added after manufacture of the clear plastic part. The main function of the present invention (to be sold by Perry's Music as ChordBuddy Jr. guitar apparatus) is to allow a student to gain the skill of strumming chords and proper timing without having to concern themselves with making the chord shapes, while building up finger dexterity and strength in the chord-making hand.

The following is a list of parts and materials suitable for use in the present invention:

PARTS LIST

| Parts Number | Description |
| --- | --- |
| 10 | guitar apparatus |
| 11 | body |
| 12 | neck |
| 13 | neck side |
| 14 | neck side |
| 15 | fret board |
| 16 | head |
| 17 | tuning pegs |
| 18 | frets |
| 19 | pick guard |
| 20 | bridge |
| 21 | slot |
| 22 | nut/connector/anchor |
| 23 | base portion |
| 24 | string depression |
| 25 | side anchor/projection |
| 26 | side anchor/projection |
| 27 | socket/longitudinal slot |
| 28 | lower surface |
| 29 | opening |
| 30 | raised portion |
| 31 | horizontal surface |
| 32 | vertical surface |
| 33 | front |
| 34 | rear |
| 35 | side |
| 36 | side |
| 37 | distance |
| 38 | distance |
| 40 | chord playing attachment |
| 41 | frame |
| 42 | side |
| 43 | side |
| 44 | angled flange/diagonally extending tab |
| 45 | angled flange/diagonally extending tab |
| 46 | opening |
| 47 | opening |
| 48 | transverse portion |
| 49 | central post/leg/flange |
| 50 | lever/depression member |
| 51 | lever/depression member |
| 52 | lever/depression member |
| 53 | lever/depression member |
| 54 | button |
| 55 | button |
| 56 | button |
| 57 | button |
| 58 | depression member |
| 59 | depression member |
| 60 | depression member |
| 61 | depression member |
| 62 | arch |
| 63 | fasteners |
| 64 | arrow |
| 65 | surface |
| S | strings |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. Apparatus adapted to attach to a guitar having strings, a fretted neck, head and body, the apparatus comprising;

a chord playing unit adapted to be positioned on the fretted neck of the guitar the chord playing unit including a plurality of independently removable chord members, each chord member positioned substantially parallel to the strings and capable of depressing preselected strings of the guitar to make a chord, wherein the chord playing unit has an arch that is positioned above the proximate end of the guitar neck at the point where the guitar neck attaches to the guitar head.

2. The chord playing attachment of claim 1, wherein there are at least four chord ports.

3. The chord playing attachment of claim 2, wherein the chord playing arch unit includes first and second sides.

4. The chord playing attachment of claim 2, wherein the arch is positioned above the proximate end of the guitar neck at the point where the guitar neck attaches to the guitar head in a position that is perpendicular to the strings, the chord playing attachment further includes diagonally extending flanges, each connected to a side of the arch.

5. The chord playing attachment of claim 4, wherein each chord member has a finger pad.

6. The chord playing attachment of claim 2 wherein the arch has a central post.

7. A method of using a chord playing attachment to learn to play a guitar, comprising:
   a) attaching a plurality of independently removable lever operated chord members to the guitar that can be used to play chords in a desired key;
   b) playing chords on the guitar by depressing the chord members until understanding is gained; and
   c) spacing the levers above the guitar strings with an arch, wherein the arch is positioned above the proximate end of the guitar neck at the point where the guitar neck attaches to the guitar head in a position that is perpendicular to the strings.

8. The method of claim 7, further comprising playing chords as described in a companion manual.

9. The method of claim 8, wherein the chord members have finger pads of different colors and the companion manual describes the order of the chords to be played by means of a legend which is color coded to correspond to colors of finger pads of the chord members.

10. A chord playing attachment apparatus adapted to attach to a guitar having strings, a fretted neck, head and body comprising;
   a) a chord playing unit releasably and removably adapted to be positioned above the fretted neck of the guitar
   b) the chord playing unit including a plurality of independently removable lever members, each lever member positioned substantially parallel to the strings,
   c) each lever member further comprising one or more string depressors capable of depressing preselected strings of the guitar to make a preselected chord; and
   d) wherein the chord playing unit has an arch and the strings do not engage the chord playing unit at the arch.

11. The chord playing attachment of claim 10, wherein the chord playing unit arch is positioned above the proximate end of the guitar neck at the location near where the guitar neck attaches to the guitar head.

12. The chord playing attachment apparatus of claim 10, wherein there are at least four levers.

13. The chord playing attachment apparatus of claim 10, wherein the chord playing unit includes first and second spaced apart sides that each connect with a side anchor.

14. The chord playing attachment of claim 13, wherein the chord playing unit sides each include a diagonally extending flange.

15. The chord playing attachment of claim 10, wherein each lever has a finger pad.

16. The chord playing attachment of claim 10, wherein the lever members are selected to make chords in the key of A.

17. The chord playing attachment of claim 10, wherein the lever members are selected to make chords in the key of G.

18. Apparatus comprising a guitar and the apparatus of claim 10, wherein the apparatus of claim 10 is attached to the guitar.

\* \* \* \* \*